Patented Sept. 16, 1924.

1,508,455

UNITED STATES PATENT OFFICE.

CHARLES A. KRAUS, OF WORCESTER, MASSACHUSETTS.

GLASS.

No Drawing.  Application filed October 13, 1920. Serial No. 416,700.

*To all whom it may concern:*

Be it known that I, CHARLES A. KRAUS, a citizen of the United States, residing at Worcester, in the county of Worcester and State of Massachusetts, have invented certain new and useful Improvements in Glass, of which the following is a full, clear, and exact description.

My invention relates to improvements in the composition of glasses and is addressed in particular to glasses having a low coefficient of expansion and having other properties which render them commercially useful.

In patent application Serial No. 404,863, filed August 20, 1920, I have described a number of glasses having a low coefficient of expansion. As I showed there, the Hovestadt numbers which have heretofore been employed in predetermining the coefficient of expansion of a given composition are largely in error when applied to glasses having a low coefficient of expansion. I have found further that the partial coefficients employed in calculating the coefficient of expansion of a given composition are governed not alone by the magnitude of the coefficient of expansion of the composition, but depend also upon the nature of the constituent oxides which go to make up the composition. Furthermore, it appears that the relation between the coefficient of expansion and the composition is not a linear one, but is in general a function of the amounts of the substances present.

In general, a glass in order to be commercially useful should have a low coefficient of expansion, should be resistant to the action of various solvent agents and should have a low softening temperature. In addition, it is desirable and often necessary that the substances entering into the composition shall be readily obtainable upon the market at a price which makes it possible to manufacture the glass at a low cost. In the above-mentioned patent application I have described various compositions having a low coefficient of expansion, having a high resistance to solvent action, and having a relatively low softening temperature. My present invention is in particular addressed to producing a glass having these desirable qualities and which shall contain only such ingredients as may be secured on the market readily and at a low cost.

I have found that a glass may be produced which contains as constituent substances sodium oxide ($Na_2O$), lead oxide (PbO), boric oxide ($B_2O_3$), and silica ($SiO_2$). Such glasses, in general, have very low coefficients of expansion, usually below about $4.0 \times 10^{-6}$. The possibility of the production of such a glass appears not to have been recognized heretofore. This is probably due to the general acceptance of the applicability of the Hovestadt numbers. For example, a glass containing 25 per cent of lead oxide, 11.9 per cent of boric oxide, 3.1 per cent of sodium oxide, and 60 per cent of silica would have, according to the Hovestadt numbers, a coefficient of linear expansion of approximately $5.2 \times 10^{-6}$. The actual coefficient of expansion of this glass is $3.8 \times 10^{-6}$. A glass containing 50 per cent of silica, 3.1 per cent of sodium oxide, 6.9 per cent of boric oxide, and 40 per cent of lead oxide would, according to the Hovestadt numbers, have a coefficient of linear expansion of 6.4, where the actual coefficient of expansion of such composition is 4.95. It is evident, therefore, that the Hovestadt numbers are entirely unreliable and that they cannot be used in determining the coefficient of expansion of proposed compositions, if the composition in question is one which has a low coefficient of expansion. Moreover, this failure of the Hovestadt numbers is not confined to glasses having a high content of silica, as has been suggested by Sullivan and Taylor. In the examples above given the content of silica is low, as compared with that of ordinary glasses, and yet the Hovestadt numbers do not hold.

The numbers which I have given for the partial coefficients for the various oxides in my above-mentioned patent application hold well for glasses of the type as exemplified in the table given in that application, but require modification when applied to compositions containing sodium oxide and lead oxide in larger amounts. I find that while in the presence of potassium oxide the partial coefficient for lead oxide is approximately a value of 2.3, in the presence of sodium oxide the partial coefficient is smaller than 2.3. For glasses which do not contain too large an amount of lead oxide, for example, which contain less than 25 per cent, a partial coefficient of 1.6 is in good agreement with the actually determined coefficients of expansion. To illustrate the action of lead oxide in the presence of sodium oxide and of potassium oxide I cite the following examples: A glass containing 60 per cent of silica, 3.1 per cent of potassium oxide, 11.9 per cent of boric oxide, and 25 per cent of lead oxide has a coefficient of expansion of $4.15 \times 10^{-6}$. This is in fair agreement with the coefficient of expansion as calculated according to the partial coefficients as given in my patent application Serial No. 404,863. A glass, however, containing the same amounts of silica, boric oxide, and lead oxide, but containing 3.1 per cent of sodium oxide, in place of the potassium oxide, has a coefficient of $3.8 \times 10^{-6}$. While it might be said that the difference in the coefficients of these two glasses could be equally well explained by assuming that the coefficient for sodium oxide is smaller than the value 12.0 as given in my earlier patent application, such an assumption would not lead to results in agreement with the measured values in the case of glasses having lower and higher contents of lead oxide. But, however the coefficients may be adjusted for the purpose of accounting for the measured coefficient of expansion, the fact remains, and this is an important element of my invention, that a glass containing a given amount of lead oxide in the presence of sodium oxide has a lower coefficient of expansion than a similar glass which contains potassium oxide.

I have found, moreover, that the glasses which contain sodium oxide possess certain other advantages over glasses containing potassium oxide. Thus, the glasses which contain sodium oxide are somewhat more readily fusible; that is to say, they possess a lower softening temperature than glasses containing a corresponding amount of potassium oxide. So, also, I find that lead glasses containing sodium oxide are reduced less readily in the flame than are glasses containing potassium oxide.

In the following table are given the compositions of various glasses which exemplify my invention, together with some of the more important properties of these glasses. Under the column headed $a$ is given the measured linear coefficient of expansion multiplied by $10^6$. Under the column headed H is given the relative hardness factor of the various glasses referred to pyrex glass, containing substantially 70 per cent of silica, 20 per cent of boric oxide, 4 per cent of sodium oxide, and 6 per cent of alumina, as a standard for comparison. The method of determining the relative hardness of glasses I have described in my application for Letters Patent above referred to. Under the column headed S is given the solubility of the glass in water. The method employed for determining the solubility is likewise described in the above-named patent application.

Table.

| No. | $SiO_2$ | $B_2O_3$ | $Na_2O$ | PbO | $K_2O$ | $a \times 10$ | H. | S. |
|---|---|---|---|---|---|---|---|---|
| 1 | 68 | 16.9 | 3.1 | 12 | | 3.22 | 0.078 | |
| 2 | 60 | 11.9 | 3.1 | 25 | | 3.81 | 0.027 | 0.025 |
| 3 | 68 | 9.5 | 2.5 | 20 | | 3.32 | 0.14 | |
| 4 | 60 | 11.9 | | 25 | 3.1 | 4.15 | 0.038 | |
| 5 | 50 | 6.9 | 3.1 | 40 | | 4.95 | 0.004 | 0.018 |
| 6 | 65 | 4.8 | 2.2 | 28 | | 3.64 | 0.15 | |

Glasses of the type which I have above described are in general stable; that is, on cooling off such glasses from the homogeneous molten condition, no precipitation of material takes place as the temperature falls. Too large an amount of boric oxide in the presence of lead oxide may lead to instability, so that in general it is desirable not to have the content of boric oxide too high. Stability may, however, be realized in general in such cases by increasing the amount of sodium oxide. A low percentage of boric oxide, moreover, is often advantageous from a manufacturing point of view, since the melt is less active on the walls of the glass pot.

It will be understood that at times it is desirable to produce an opalescent glass, that is a glass which contains within the body of the mass small particles of material which give to it a white or translucent appearance. Since it is always necessary for commercial purposes to control the opaqueness or transparency of such a product, such glasses come within the scope of these specifications.

At times it is desirable to give to a glass color in order to meet some particular requirement, for which purpose certain oxides are in general added as it is well understood by one skilled in the art. So, also, it may be desirable to add some particular element, as for example barium oxide, for the purpose of giving to the glass certain properties, as for example a high index of refraction. It is to be understood that the constituents which I have given in these specifications are the essential constituents only and that other constituents may be added for particular purposes without departing from my invention.

An examination of the column headed $a$ shows that the glasses here described possess a low coefficient of thermal expansion. Of the glasses containing sodium oxide, only that of glass No. 5 is greater than $4.0 \times 10^{-6}$ and in this case the glass contains as much as 40 per cent of lead oxide.

In general the solubility of these glasses is extremely low. This is an important factor in the production of cooking utensils, chemical glassware, and the like.

The great advantage which these glasses have over other glasses of low coefficient of expansion as obtainable upon the market at the present time is their relatively low softening temperature. Glasses which have a high softening temperature are usually termed hard glasses. Under the column headed H are given the relative hardness factors in terms of that of pyrex glass, as described in the specifications above. It will be seen that all these glasses are relatively very soft.

What I claim and wish to secure by Letters Patent is:

1. A glass containing lead oxide and having a coefficient of thermal expansion below about $4.0 \times 10^{-6}$.

2. A glass containing lead oxide and sodium oxide and having a coefficient of expansion less than about $4.0 \times 10^{-6}$.

3. A glass containing lead oxide and having a coefficient of expansion less than about $4.0 \times 10^{-6}$ and solubility less than 0.050.

4. A glass containing lead oxide, having a coefficient of expansion less than about $4.0 \times 10^{-6}$ and a hardness less than 0.9.

5. A glass containing lead oxide, having a coefficient of expansion less than about $4.0 \times 10^{-6}$, a hardness less than 0.9 and a solubility less than 0.05.

6. A glass containing lead oxide and not more than 5 per cent of sodium oxide and having a coefficient of expansion less than about $4.95 \times 10^{-6}$.

7. A glass containing more than 25 per cent of lead oxide and having a coefficient of expansion lower than about $4.95 \times 10^{-6}$.

8. A glass containing less than 70 per cent of silica and more than 10 per cent of lead oxide, and having a coefficient of expansion less than about $4.0 \times 10^{-6}$.

9. A glass containing less than 70 per cent of silica, more than 10 per cent of lead oxide, and containing also boric oxide and alkali, and having a coefficient of expansion less than about $4.0 \times 10^{-6}$.

10. A glass containing more than 10 per cent of lead oxide and less than 70 per cent of silica, and having a coefficient of expansion below about $4.0 \times 10^{-6}$, and a hardness less than 0.9.

11. A glass containing silica, boric oxide, alkali, and the oxide of lead, and having a coefficient of expansion less than about $4.0 \times 10^{-6}$.

12. A glass containing silica, lead oxide, and an alkali, and having a coefficient of expansion less than about $4.95 \times 10^{-6}$.

13. A glass containing silica, lead oxide, and sodium oxide and having a coefficient of expansion less than about $4.95 \times 10^{-6}$.

14. A glass containing silica, leads oxide and an alkali, having a coefficient of expansion less than about $4.95 \times 10^{-6}$ and a low softening point as compared with that of silica.

In testimony whereof I hereto affix my signature.

CHARLES A. KRAUS.